(12) United States Patent
Pelak et al.

(10) Patent No.: US 8,079,462 B2
(45) Date of Patent: Dec. 20, 2011

(54) DYNAMIC SINGULATOR

(75) Inventors: Wynn M. Pelak, Rockford, MI (US);
Matthew T. Brayman, Ada, MI (US);
Daniel O. Amarandei, Kentwood, MI (US); Clinton R. Lupton, Caledonia, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 12/972,926

(22) Filed: Dec. 20, 2010

(65) Prior Publication Data

US 2011/0083941 A1 Apr. 14, 2011

Related U.S. Application Data

(62) Division of application No. 11/970,773, filed on Jan. 8, 2008, now Pat. No. 7,854,314.

(60) Provisional application No. 60/883,893, filed on Jan. 8, 2007.

(51) Int. Cl.
*B65G 43/08* (2006.01)

(52) U.S. Cl. ......... 198/572; 198/577; 198/597; 198/608

(58) Field of Classification Search .................. 198/572, 198/577, 597, 608
See application file for complete search history.

(56) References Cited

U.S. PATENT DOCUMENTS

| | | | |
|---|---|---|---|
| 2,354,360 A | 7/1944 | Bigelow | |
| 3,651,921 A * | 3/1972 | Hill | 198/456 |
| 4,039,074 A | 8/1977 | Maxted | |
| 4,372,442 A | 2/1983 | Fleischauer | |
| 4,746,003 A | 5/1988 | Yu et al. | |
| 5,005,693 A | 4/1991 | Fultz et al. | |
| 5,086,910 A * | 2/1992 | Terpstra | 198/572 |
| 5,150,781 A | 9/1992 | Deisenroth et al. | |
| 5,193,659 A * | 3/1993 | Marshall | 198/419.2 |
| 5,979,636 A | 11/1999 | Vanacore et al. | |
| 6,253,905 B1 | 7/2001 | Pelka | |
| 6,443,292 B1 | 9/2002 | Grund | |
| 6,464,065 B2 | 10/2002 | Herubel et al. | |
| 6,471,044 B1 | 10/2002 | Isaacs et al. | |

(Continued)

OTHER PUBLICATIONS

Commonly assigned U.S. Appl. No. 11/825,757, filed Jul. 9, 2007, entitled Conveyor System With Dynamic Gapping and Method of Slug Building.

*Primary Examiner* — Joseph A Dillon, Jr.
(74) *Attorney, Agent, or Firm* — Gardner, Linn, Burkhart & Flory, LLP

(57) ABSTRACT

An article singulating conveyor assembly and method of singulating articles includes providing a conveying surface defining a plurality of tandem zones. The conveying surface travels in a longitudinal direction. Each of the zones includes a pair of laterally spaced side frame members and a plurality of generally parallel elongated driven rollers that are supported at the side frame members. The driven rollers are adapted to provide lateral variation in the longitudinal speed of the conveying surface. Each of the zones includes at least one drive motor that is adapted to drive the driven rollers in that zone. At least one article sensor is provided that is adapted to sensing articles in the zones. The driven rollers may be divided into a plurality of segmented rollers that are separately rotatable with a separate drive motor to drive corresponding segments for a zone. The drive motors for adjacent zones may be activated in a manner that creates a longitudinal gap between longitudinally adjacent articles.

21 Claims, 4 Drawing Sheets

U.S. PATENT DOCUMENTS

| | | | |
|---|---|---|---|
| 6,484,886 B1 | 11/2002 | Isaacs et al. | |
| 6,629,018 B2 | 9/2003 | Mondie et al. | |
| 6,843,362 B2 | 1/2005 | Tachibana et al. | |
| 6,897,625 B2 | 5/2005 | Brixius et al. | |
| 6,910,569 B2 | 6/2005 | Reznik et al. | |
| 7,090,067 B2 | 8/2006 | Schiesser et al. | |
| 7,114,613 B2 * | 10/2006 | Brouwer et al. | 198/786 |
| 7,191,895 B2 | 3/2007 | Zeitler et al. | |
| 7,383,935 B2 | 6/2008 | Tasma et al. | |
| 7,413,071 B2 * | 8/2008 | Zeitler et al. | 198/460.1 |
| 7,556,144 B2 * | 7/2009 | Cotter et al. | 198/835 |
| 7,631,747 B2 * | 12/2009 | Zeitler | 198/460.1 |

* cited by examiner

DYNAMIC SINGULATOR

CROSS-REFERENCE TO RELATED APPLICATIONS

The present invention is a division of U.S. patent application Ser. No. 11/970,773, filed on Jan. 8, 2008, now U.S. Pat. No. 7,854,314, which claims priority from U.S. patent application Ser. No. 60/883,893, filed on Jan. 8, 2007, the disclosures of which are hereby incorporated herein by reference in their entirety.

BACKGROUND OF THE INVENTION

The present invention is directed to a conveying system and, in particular, to an article singulating conveyor assembly.

Article singulating, or unscrambling, is the process of arranging clusters of articles into single-file with few, if any, side-by-side articles that are laterally adjacent to each other. Traditional tapered and skewed roller unscramblers require that side-by-side packages need to travel a relatively long longitudinal distance in order to find a gap downstream of a series of longitudinally back-to-back articles. Moreover, prior unscramblers tend to operate at very high speeds and are physically too long to practically fit into many facilities.

SUMMARY OF THE INVENTION

The present invention is directed to an article singulation conveyor assembly and method of singulating articles that is capable of singulating a mix of article sizes in a relatively short unit length and at relatively low speeds compared to known article unscrambler assemblies.

An article singulating conveyor assembly and method of singulating articles, according to an aspect of the invention, includes providing a conveying surface traveling in longitudinal direction and defining a plurality of tandem zones of the conveying surface. Each of the zones is made up of a pair of laterally spaced side frame members and a plurality of generally parallel elongated driven rollers supported at the side frame members. The driven rollers are each divided into a plurality of segmented roller sections that are separately rotatable. Each of the zones is further made up of a plurality of drive motors, each adapted to drive corresponding segments for the driven rollers in that zone. At least one article sensor is provided that is adapted to sensing articles in the zones. A control is responsive to the at least one article sensor and is adapted to activate the plurality of drive motors for each of said zones in a manner that tends to singulate laterally adjacent articles.

The drive motors may be motorized rollers. The motorized rollers may drive the corresponding segments for the driven rollers in that zone through endless belts, such as O-rings. The at least one article sensor may be a plurality of article sensors, each for sensing articles in a particular zone. The article sensors may be any known article sensor, such as a proximity sensor, sensors positioned between the rollers, detector beams directed across the conveyor path or a combination of these.

The control may selectively activate the plurality of drive motors for the plurality of tandem zones in a manner that moves one of a pair of laterally adjacent articles toward a gap between the pair of laterally adjacent articles and an article longitudinally spaced from the pair of laterally adjacent articles. The conveying surface may be adapted to move the one of the pair of laterally adjacent articles toward the gap by providing a lateral bias biasing articles toward one of said side frame members. The driven rollers defining the conveying surface may be skewed in order to provide the lateral bias biasing articles toward one of said side frame members.

An article singulating conveyor and method of singulating articles, according to another aspect of the invention, includes providing a conveying surface traveling in a longitudinal direction, the conveying surface defining a plurality of tandem zones. Each of said zones is made up of a pair of laterally spaced side frame members and a plurality of generally parallel elongated driven rollers supported at the side frame members. The driven rollers are adapted to provide lateral variation in the longitudinal speed of the conveying surface. Each of the zones further includes at least one drive motor that is adapted to drive the driven rollers in that zone. At least one article sensor is provided that is adapted to sensing articles in the zones. A control activates the at least one drive motor for adjacent zones in a manner that creates a gap between longitudinally adjacent articles.

The driven rollers may have a tapered surface, thereby providing the lateral variation in the longitudinal speed of said conveying surface. The at least one drive motor may be a motorized roller. The at least one article sensor may be a zone article sensor for each of said zones. The article sensors may be any known article sensor, such as a proximity sensor, sensors positioned between the rollers, detector beams directed across the conveyor path or a combination of these. The control may detect laterally adjacent articles from an output of at least one of said zone article sensors.

The control may detect laterally adjacent articles by establishing an expected time of arrival of a leading edge of an article at a particular location and determining if the actual time of arrival of the leading edge at that location is earlier than the expected time of arrival. The control may detect laterally adjacent articles at an interface between the rollers of a zone and an upstream conveying surface upstream of that zone by operating the rollers of that zone at a speed that is different from the speed of the upstream conveying surface. The control may selectively activate the at least one drive motor for the plurality of tandem zones as a function of an output of the at least one article sensor in a manner that moves one of a pair of laterally adjacent articles toward a gap between the pair of laterally adjacent articles and an article longitudinally spaced from the pair of laterally adjacent articles. The control may adjust spaces between longitudinally adjacent articles after moving the one of a pair of laterally adjacent articles into the gap between the pair of laterally adjacent articles and an article longitudinally spaced from the pair of laterally adjacent articles.

The conveying surface may be configured to move the one of the pair of laterally adjacent articles toward the gap by providing a lateral bias biasing articles toward one of the side frame members. The driven rollers defining the conveying surface may be skewed, thereby providing the lateral bias biasing articles toward one of said side frame members.

These and other objects, advantages and features of this invention will become apparent upon review of the following specification in conjunction with the drawings.

DESCRIPTION OF THE PREFERRED EMBODIMENT

Figure 1:
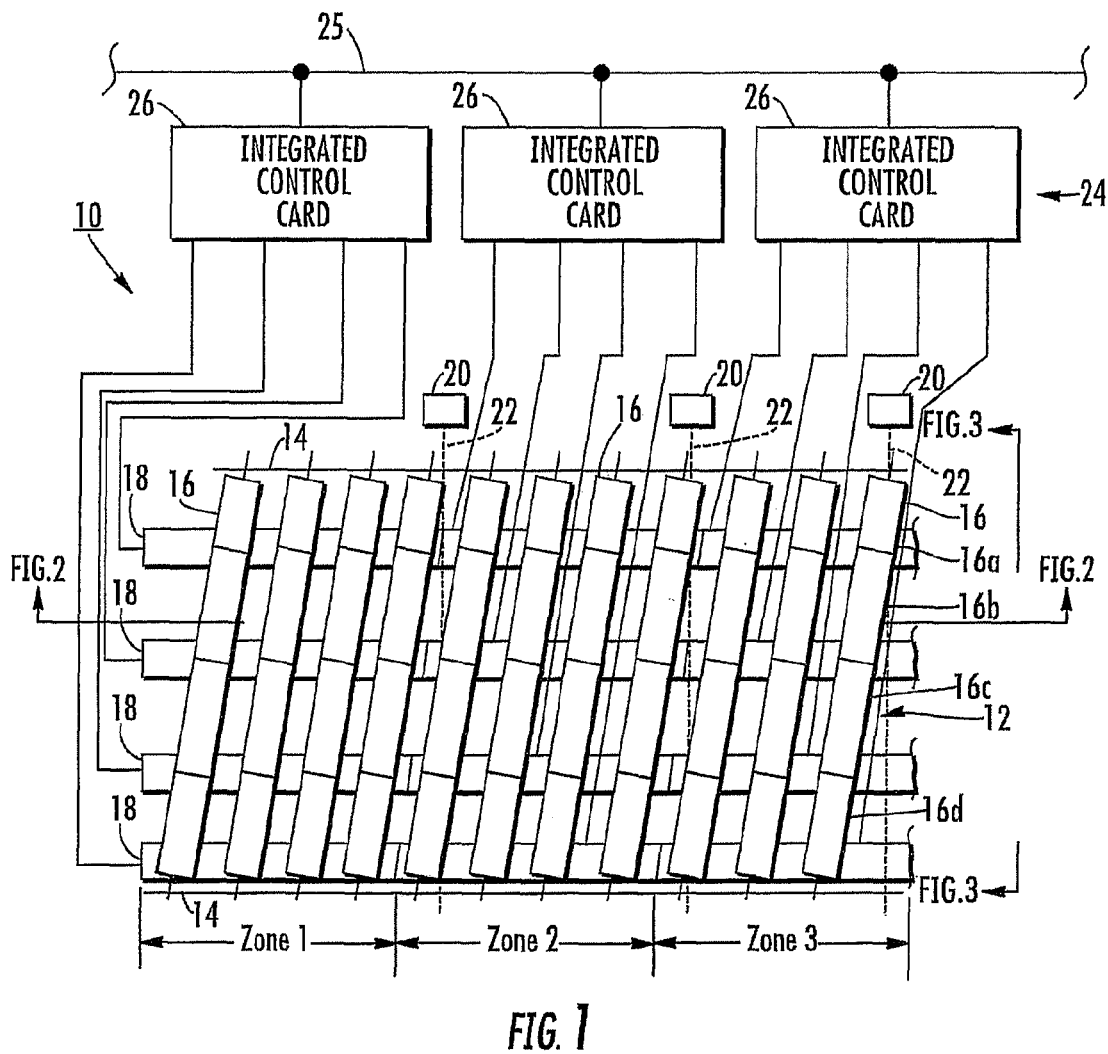
FIG. 1 is a top plan view of an article singulating conveyor assembly, according to an aspect of the invention.

Referring now specifically to the drawings, and the illustrative embodiments depicted therein, an article singulating conveyor assembly, or article unscrambler, 10 includes a conveying surface 12 defining a plurality of tandem zones illustrated as zones 1-3 (FIG. 1). It should be understood that a greater or lesser number of zones may be utilized depending upon the application. Conveyor assembly 10 includes a pair of spaced apart side frame members 14 and a plurality of generally parallel elongated driven rollers 16 supported between side frame members 14. Each of the zones further includes at least one drive motor 18 that is adapted to drive the driven rollers in that zone and an article sensor 20 that is adapted to sensing articles in that zone. In the illustrative embodiment, article sensor 20 generates a generally horizontal beam 22 across conveying surface 12 to detect articles in that zone. Article sensor 20 may be a photo detector, radar detector, ultrasonic detector, or the like. It should be understood that, in certain embodiments, article sensors can be used that do not generate a horizontal beam 22 across the conveying surface. Examples of such alternative article sensors include overhead imaging camera systems, or light bars, or proximity sensors under the conveying surface, or the like.

Articles are conveyed in a longitudinal direction on conveying surface 12 from left to right as illustrated in FIG. 1. Conveying surface 12 is capable of producing a lateral variation in article conveying speed at different lateral locations across the conveying surface 12. Also, the portion of the conveying surface 12 defined by each zone 1-3 may be controlled independently of the portion of the conveying surface defined by the other zones. In the embodiment illustrated in FIG. 1, elongated driven rollers 16 are divided into multiple segmented roller sections 16a, 16b, 16c and 16d. In the illustrated embodiment, each zone includes a number of drive motors 18 corresponding to the number of roller sections 16a-16d in that zone.

Figure 2:
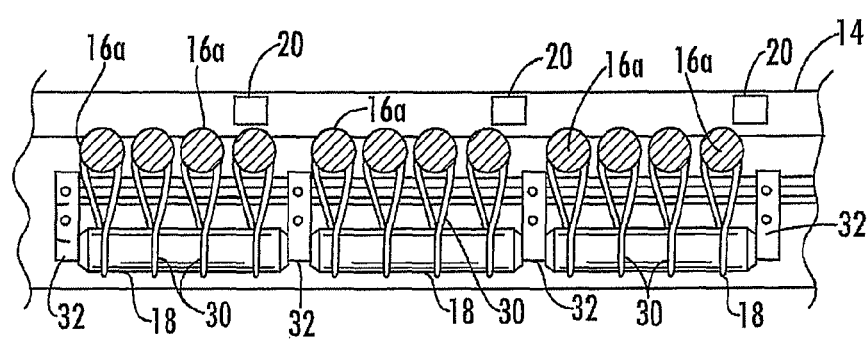
FIG. 2 is a sectional view taken along the lines II-II in FIG. 1.
Figure 3:
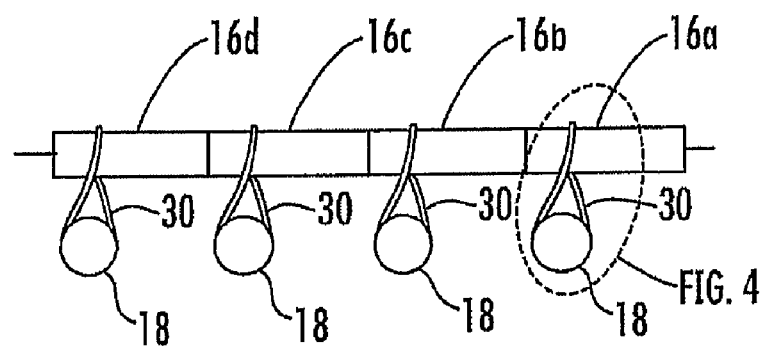
FIG. 3 is an end elevation of the article-singulating conveyor assembly of FIG. 1 taken in the direction III-III in FIG. 1.
Figure 4:
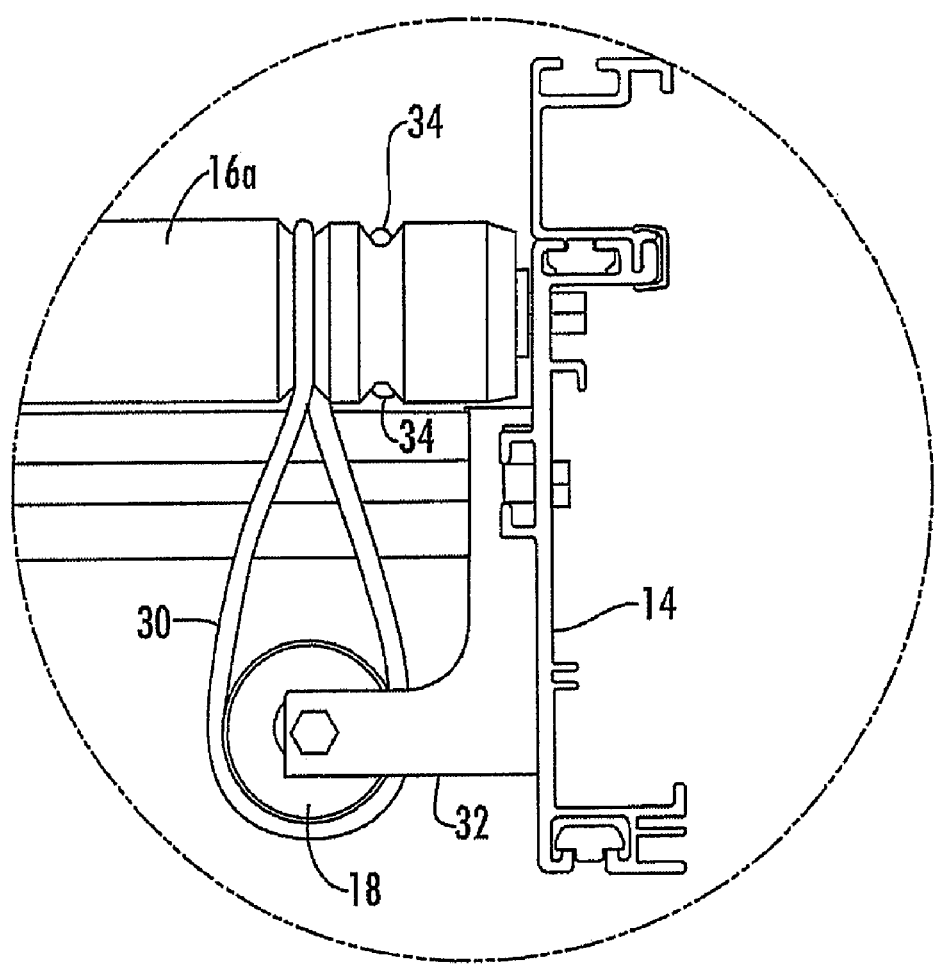
FIG. 4 is an enlarged view of the area designated IV in FIG. 3.

Each drive motor, which is illustrated as a motorized roller, may be coupled to the corresponding roller sections by endless flexible members, such as O-rings 30, as best seen in FIGS. 2-4. Drive motors 18 are positioned transverse to the axis of elongation of the rollers to provide a transverse drive according to the disclosure in commonly assigned United States Patent Application Publication No. 2005/0040016 A1 entitled MOTORIZED ROLLER TRANSVERSE DRIVE, the disclosure of which is hereby incorporated herein by reference. In the illustrative embodiment, each drive motor 18 may be a motorized roller, which is well known in the art, in which stationary motor windings are internal to a cylindrical shell which is rotated by the motor. Each motorized roller 18 may be mounted between a pair of brackets 32. In addition to drivingly coupling each roller section 16a-16d with the corresponding motorized roller 18, it is possible to utilize an O-ring 32 to couple one of the roller sections of that zone with the corresponding motorized roller and couple the corresponding roller sections for that zone to the roller section coupled to the motorized roller via elastic bands 34 between the corresponding roller sections of that zone. Singulating conveyor assembly 10 further includes a control 24. Control 24 may take various forms both in hardware and software. In the illustrative embodiment, control 24 includes a plurality of integrated control cards, each adapted to controlling the motorized rollers for one zone. The integrated control cards may be interconnected by a network 25 with an upper level controller (not shown) to coordinate the driven rollers of the various zones. Each interface control card 26 may include a controller in communication with network 25 and a plurality of motorized roller driven circuits as disclosed in United States Patent Application Publication No. 2006/0030968 A1 entitled INTEGRATED CONTROL CARD FOR CONVEYING SYSTEMS, the disclosure of which is hereby incorporated herein by reference. However, it should be understood that separate motorized roller drive circuits may be used with each motorized roller 18, some or all of which may be controlled from a common upper level control.

Thus, when a motorized roller 18 is rotated, the corresponding roller sections, such as 16a, as illustrated in FIG. 2, rotate for that zone. If the motorized roller 18 is drivingly connected with roller sections 16b for a particular zone is rotated, the roller sections 16b for that zone are rotated. Because each of the motorized rollers for a zone can be operated generally independently of each other, the roller sections in that zone can be operated at different speeds from each other, thereby allowing for speed variations laterally across conveying surface 12 in each zone. In the illustrated embodiment, driven rollers 16 are skewed with respect to side frame members 14. This tends to drive articles toward one of the side frame members. Also, the motorized rollers of each zone are capable of being operated independently of the motorized rollers of the other zones. Accordingly, both lateral speed variations and longitudinal speed variations may be obtained on conveying surface 12, thus providing the ability to create longitudinal gaps between articles by driving the conveying surface at different speeds between zones and to drive each side-by-side article at a different speed to separate the side-by-side articles to longitudinally spaced articles. Once the side-by-side articles are longitudinally separated, the bias created by the skew of the driven rollers positions the laterally spaced articles into longitudinal gaps along one side rail. Although only three zones are illustrated in FIG. 1, for a four-zone conveyor assembly, a total number of 16 possible speed variations may be obtained for the singulating conveying assembly. This allows exceptional ability to singulate articles in a short unit length and at relatively low speeds. This may be accomplished in a relatively low cost unit utilizing components that are either readily commercially available or are of straightforward manufacture.

In an alternative embodiment, a singulating conveyor assembly, or article unscrambler, 110 includes a conveying surface 112 that defines a plurality of tandem zones illustrating zones 1-7 (FIGS. 7a-7e). Each of the zones includes a pair of side frames 14 and a plurality of generally parallel elongated driven rollers 116 supported between side frames 14. Singulating conveyor assembly 110 achieves a variation in speed laterally across conveying surface 112 by the utilization of tapered rollers for driven rollers 116. As disclosed in commonly assigned U.S. Pat. Nos. 5,415,281; 6,253,905; and 6,390,277 and Patent Application Publication No. 2005/0167244 A1, the disclosures of which are hereby incorporated herein by reference, the portion of the surface of a tapered roller defined by the larger diameter end of the tapered roller travels at a higher speed along the longitudinal direction of the conveying surface 112 than does the portion of the conveying surface defined by a lesser diameter. Thus, from the largest diameter of the tapered roller to the smallest diameter of the tapered roller, a decrease in longitudinal speed is obtained laterally of the conveying surface. Also, in the illustrated embodiment, driven rollers 116 are skewed with respect to side frame member 14. This tends to bias articles toward one of the side frame members. The manner in which driven rollers 116 are skewed in FIGS. 7a-7e would tend to bias the articles toward the side frame member adjacent to the slower speed of the conveying surface, although the opposite skew could be used.

Singulating conveyor assembly 10, 110 is capable of singulating laterally adjacent articles. In order to accomplish this, control 24 ensures a longitudinal gap adjacent to a pair of laterally adjacent articles and moves one of the pair of laterally adjacent articles toward the gap. Also, control 24 may be capable of detecting laterally adjacent articles from outputs of article sensors 20, as will be described in more detail below.

Figure 7A:
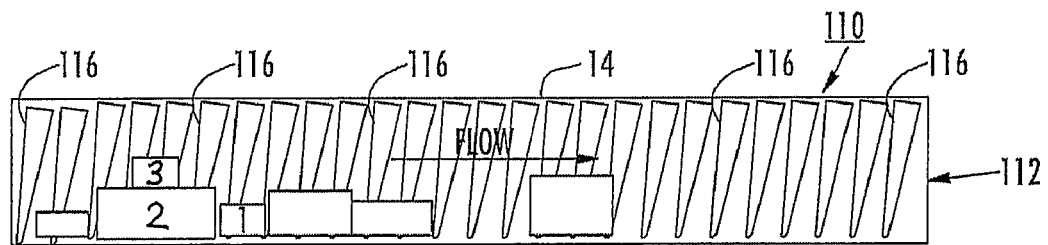
FIGS. 7a-7e illustrate a method of singulating articles, according to an aspect of the invention.
Figure 7B:
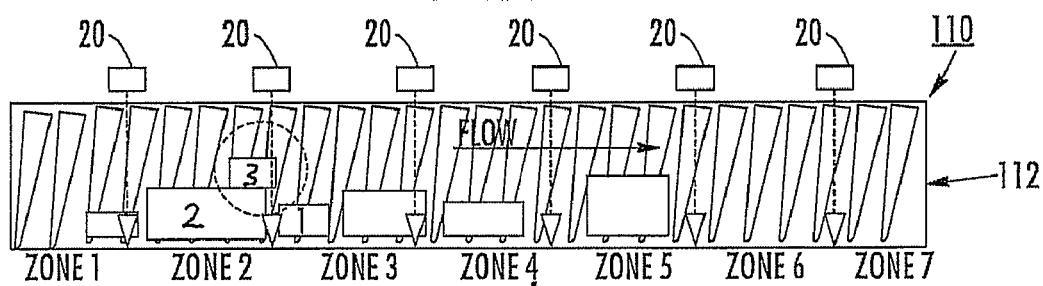
Figure 7C:
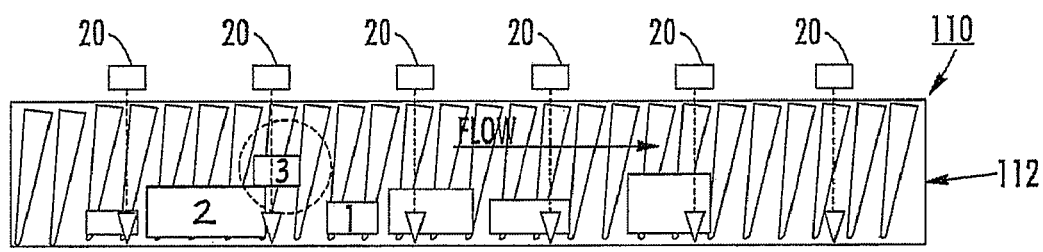
Figure 7D:
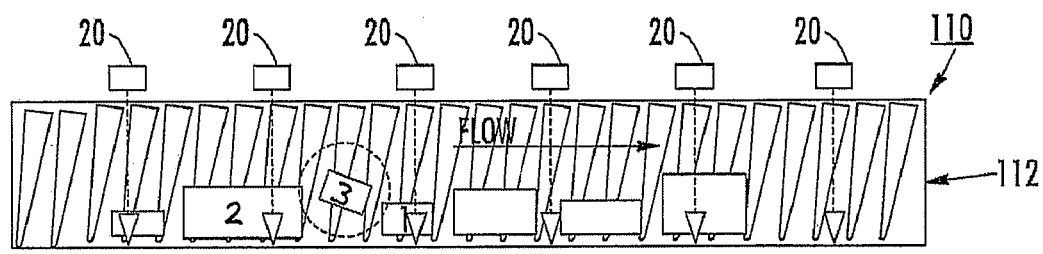
Figure 7E:
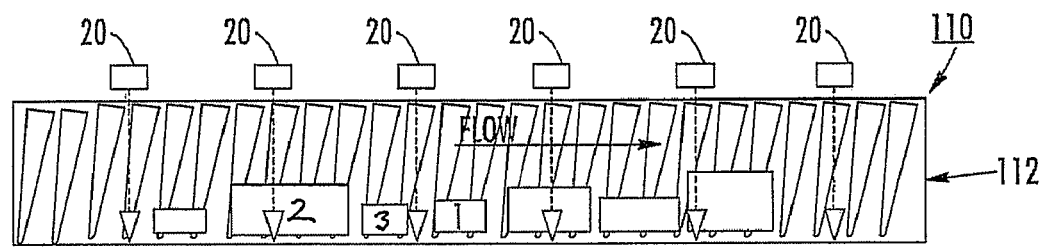

Referring now to FIGS. 7a-7e, it is seen that articles 2 and 3 are laterally adjacent to each other (FIG. 7a). Because the longitudinal speed of conveying surface 112 is greatest at the wide diameter of rollers 116, article 3 travels at a longitudinally greater speed than article 2, thereby moving ahead of article 2 (FIG. 7b). In addition, a gap is opened between laterally adjacent articles 1 and 2 in order to provide a place for inserting article 3 (FIG. 7c). This may be accomplished at the interface between zones 2 and 3 by slowing down the portion of the conveying surface of zone 2 relative to that of zone 3 or vice versa. This opens the gap between articles 1 and 2. Due to the skew of rollers 116, article 3 moves in the direction of the lower side frame member, as viewed in FIG. 7d, to move into the gap opened between articles 1 and 2. In this manner, side-by-side articles 2 and 3 are singulating in the longitudinal distance of a pair of tandem zones. Once the articles are singulated (FIGS. 7a-7d), the longitudinal spacing between articles can be optimized such as to produce a slug of articles (FIG. 7e) utilizing the principles disclosed in commonly assigned U.S. patent applications Ser. No. 60/806, 865 filed Jul. 10, 2006, and Ser. No. 11/825,757 filed Jul. 9, 2007, by Christopher Groom, entitled CONVEYOR SYSTEM WITH DYNAMIC GAPPING AND METHOD OF SLUG BUILDING, the disclosures of which are hereby incorporated herein by reference.

Laterally side-by-side articles can be singulated in a similar fashion utilizing singulating conveyor assembly 10 as described above with respect to singulating conveyor assembly 110. However, instead of utilizing the surface characteristics of taper rollers to produce lateral speed changes across conveying surface 112, lateral speed changes are developed across conveying surface 12 by the selective actuation of the motorized rollers 18 for that zone at different speeds. Thus, when it is desired to move one article ahead of a laterally adjacent article, the motorized rollers corresponding to the roller sections under that article are rotated at a higher speed than the motorized rollers corresponding to the roller sections under the other article. In order to develop longitudinal gaps between articles in order to provide a location in which to put one of two or more side-by-side articles, the motorized rollers 18 beneath corresponding roller sections of adjacent zones may be operated in a fashion similar to that described with respect to FIGS. 7a-7e in order to retard the cluster of articles while allowing an adjacent article to move forward relative to that cluster of side-by-side articles. The skew of driven rollers 16 will tend to move the separated side-by-side articles into the longitudinal gaps.

Various techniques may be utilized to determine the presence of side-by-side articles, or clusters of articles. Known techniques may be utilized including image camera capture systems, such as cameras as well as light bars or proximity detectors under the respective conveying surface, and the like. Such sensing techniques are disclosed in U.S. Pat. No. 7,090, 067 entitled CONVEYOR SYSTEM WITH DISTRIBUTED ARTICLE MANIPULATION, the disclosure of which is hereby incorporated herein by reference.

Figure 5A:
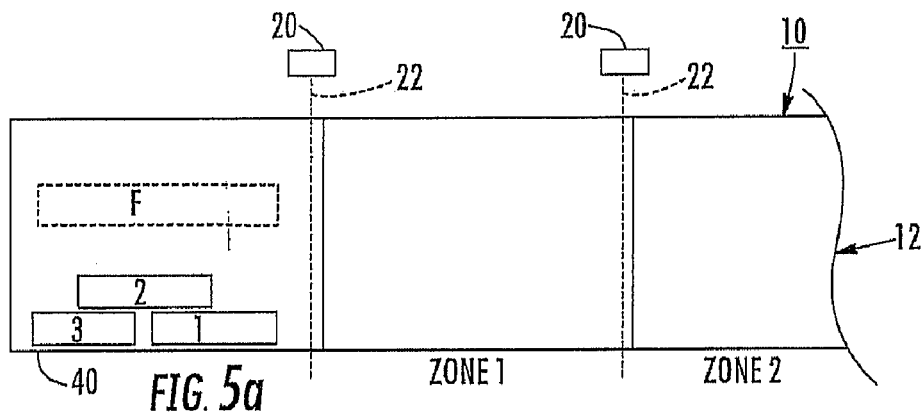
FIGS. 5a and 5b are a top plan view of an article-singulating conveyor assembly illustrating the detecting of laterally adjacent articles.
Figure 5B:
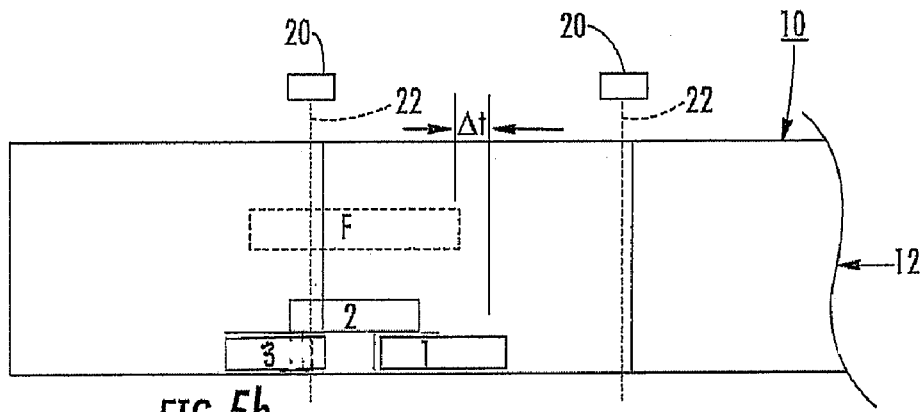

An alternative technique for determining the presence of laterally side-by-side articles, which utilizes a lateral beam extending across the conveying surface to detect the clusters of articles, is illustrated in FIGS. 5a, 5b, 6a and 6b. A cluster of articles 1, 2 and 3 and the footprint F for the cluster of articles is shown in FIG. 5a. As the cluster of articles is transferred from a conveyor 40 upstream of zone 1, a speed increase occurs at the transition. As seen in FIG. 5b, the speed increase causes article 1 to move ahead of the footprint of the cluster by an amount illustrated as $\Delta t$. Without any further change in speed, when the cluster arrives at the beam 22 between zone 1 and zone 2, the arrival of the leading edge of article 1 sooner than the estimated time of arrival of the footprint F of the cluster without a reconnection of beam 22 while footprint F is passing the beam is interpreted by control 24 as the presence of the cluster. Once a cluster of laterally adjacent articles is detected, the articles of the cluster can be separated such as by applying a relative speed increase at the transition between zone 1 and zone 2 or by using techniques previously described. Also, when clusters are present, the speeds of zones 1 and 2 may be returned to the same speed after the cluster has passed. Alternatively, if no cluster is detected, the speeds of zones 1 and 2 can remain the same.

Figure 6A:
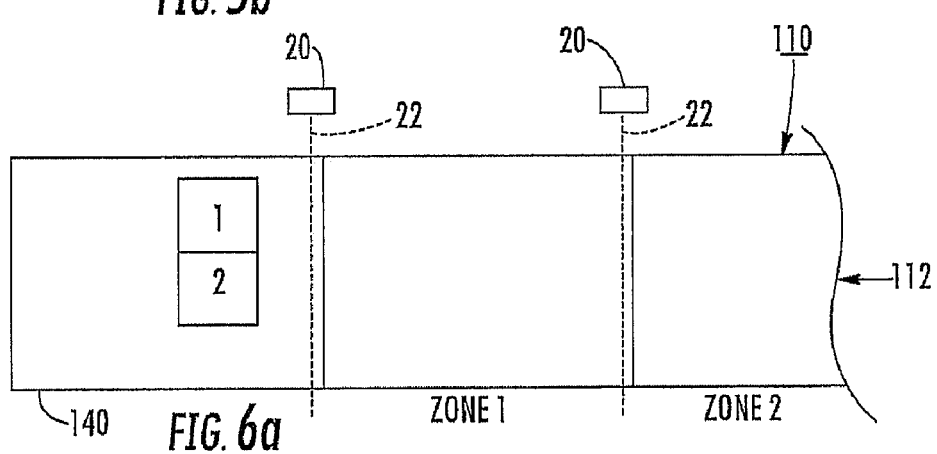
FIGS. 6a and 6b are the same views as FIGS. 5a and 5b illustrating an alternative embodiment thereof.
Figure 6B:
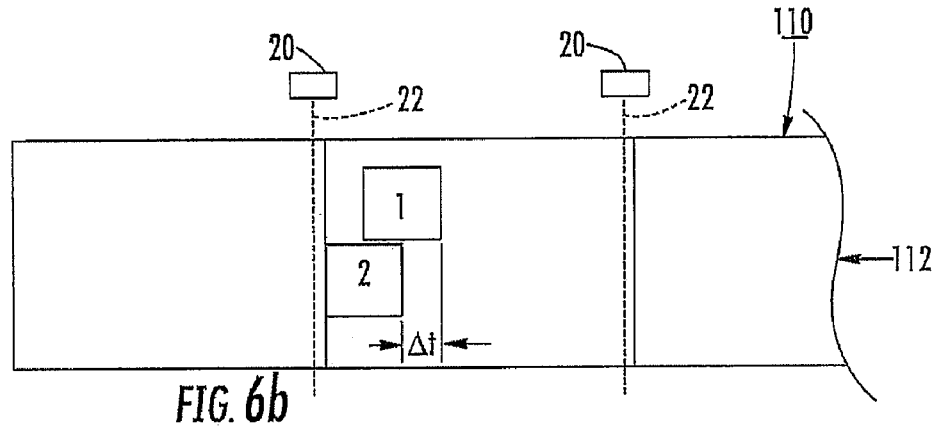

An alternative technique for detecting clusters of side-by-side articles is illustrated with respect to FIGS. 6a and 6b. When utilized in conjunction with singulating conveyor assembly 10, 110, the transfer of the cluster of articles 1 and 2 from upstream conveyor 140 to zone 1 causes article 1 to move ahead of article 2 due to the longitudinal speed gradient laterally across conveying surface 112 previously described. This will cause article 1 to arrive at beam 22 between zones 1 and 2 ahead of the estimated time of arrival of the footprint of the combined articles 1 and 2 if they were one article as illustrated by $\Delta t$. This arrival before the estimated time of arrival of the footprint allows singulating conveyor assembly 110 to create a gap between the cluster of articles 1 and 2 and any adjacent article in the manner described with respect to FIGS. 7a-7e.

Thus, it is seen that the embodiments disclosed herein are capable of singulating articles in a relatively short longitudinal distance. This allows the singulation function to be performed in areas that would not easily accommodate conventional article unscramblers. This is especially useful in retrofitting of existing conveyor systems for the incorporation of different layouts and sortation equipment. However, it may also be used in new installations including areas where space is limited. Moreover, the embodiments disclosed herein are capable of operating at lower speeds than some conventional article unscramblers. The lower speeds reduce noise as well as wear of the equipment. This may also be accomplished utilizing equipment that is reasonably low cost and readily available. This further enhances the reliability of the equipment and minimizes the necessity for extensive training of operating personal and maintenance personnel.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An article singulating conveyor assembly, comprising:
a conveying surface defining a plurality of tandem zones, said conveying surface traveling in longitudinal direction;
each of said zones comprising a pair of laterally spaced side frame members and a plurality of generally parallel elongated driven rollers supported at said side frame members, said driven rollers each having a tapered surface thereby providing lateral variation in the longitudinal speed of said conveying surface;
each of said zones further comprising at least one drive motor that is adapted to drive the driven rollers in that zone;
at least one article sensor that is adapted to sensing articles in said zones; and
a control, wherein said control is adapted to detect laterally adjacent articles from an output of said at least one article sensor wherein said control is adapted to activate said at least one drive motor for adjacent zones at the laterally adjacent articles in a manner that creates a longitudinal gap between the laterally adjacent articles and an article that is longitudinally spaced from the laterally adjacent articles, wherein said conveying surface is adapted to move one of the laterally adjacent articles ahead of another of the laterally adjacent articles due to the lateral variation in the longitudinal speed of the conveying surface and move the one of the laterally adjacent articles into the longitudinal gap between the laterally adjacent articles and article longitudinally spaced from the laterally adjacent articles by providing a lateral bias biasing articles toward one of said side frame members.

2. The assembly as claimed in claim 1 wherein said at least one drive motor comprises a motorized roller.

3. The assembly as claimed in claim 1 wherein said at least one article sensor comprises a zone article sensor for each of said zones.

4. The assembly as claimed in claim 3 wherein each said zone article sensor comprises a lateral beam extending across said conveying surface.

5. The assembly as claimed in claim 4 wherein said control is adapted to detect laterally adjacent articles from an output of at least one of said zone article sensors.

6. The assembly as claimed in claim 5 wherein said control is adapted to detect laterally adjacent articles by establishing an expected time of arrival of a leading edge of an article at said beam and determining if the actual time of arrival of the leading edge at said beam is different from the expected time of arrival.

7. The assembly as claimed in claim 6 wherein said control is adapted to detect laterally adjacent articles at an interface between the rollers of a zone and an upstream conveying surface upstream of that zone by operating the rollers of that zone at a speed that is different from the speed of the upstream conveying surface.

8. An article singulating conveyor assembly, comprising:
a conveying surface defining a plurality of tandem zones, said conveying surface traveling in a longitudinal direction;
each of said zones comprising a pair of laterally spaced side frame members and a plurality of generally parallel elongated driven rollers supported at said side frame members, said driven rollers each having a tapered surface thereby providing lateral variation in the longitudinal speed of said conveying surface;
each of said zones further comprising at least one drive motor that is adapted to drive the driven rollers in that zone;
a plurality of zone article sensors, each for one of said zones, wherein each said zone article sensor comprises a lateral beam extending across said conveying surface; and
a control, wherein said control is adapted to activate said at least one drive motor for said plurality of zones as a function of outputs of said zone article sensors in a manner that creates a longitudinal gap between longitudinally adjacent articles, wherein said control is adapted to detect laterally adjacent articles at an interface between the rollers of a zone and a conveying surface upstream of that zone by operating the rollers of that zone at a speed that is different from the speed of the upstream conveying surface and by establishing an expected time of arrival of a leading edge of an article at the beam of one of said article sensors and determining if the actual time of arrival of the leading edge at that beam is different from the expected time of arrival; and
wherein said conveying surface is adapted to move one of the laterally adjacent articles toward a longitudinal gap between the laterally adjacent articles and an article longitudinally spaced from the laterally adjacent articles by selectively activating said at least one drive motor for said plurality of tandem zones as a function of an output of at least one of said zone article sensors and by providing a lateral bias biasing articles toward one of said side frame members.

9. The assembly as claimed in claim 8 wherein said rollers defining said conveying surface are skewed, thereby providing the lateral bias biasing articles toward one of said side frame members.

10. The assembly as claimed in claim 8 wherein said control is adapted to adjusting spaces between longitudinally adjacent articles after moving the one of a pair of laterally adjacent articles into the longitudinal gap between the pair of laterally adjacent articles and an article longitudinally spaced from the pair of laterally adjacent articles.

11. A method of singulating articles, comprising:
defining a plurality of tandem zones with a conveying surface said conveying surface traveling in a longitudinal direction, each of said zones comprising a pair of laterally spaced side frame members and a plurality of generally parallel elongated driven rollers supported at said side frame members, each of said zones further comprising at least one drive motor that is adapted to drive the driven rollers in that zone;
sensing articles in said zones with at least one article sensor and detect laterally adjacent articles from an output of said at least one article sensor;
each of said driven rollers having a tapered surface thereby providing lateral variation in the longitudinal speed of said conveying surface;
activating said at least one drive motor for adjacent zones at the laterally adjacent articles in a manner that creates a longitudinal gap between the laterally adjacent articles and an article that is longitudinally spaced from the laterally adjacent articles; and
moving one of the laterally adjacent articles ahead of another of the laterally adjacent articles due to the lateral variation in the longitudinal speed of the conveying surface and moving one of the laterally adjacent articles into the longitudinal gap between the laterally adjacent articles and article longitudinally spaced from the laterally adjacent articles by providing a lateral bias biasing articles toward one of said side frame members.

12. The method as claimed in claim 11 wherein said at least one drive motor comprises a motorized roller.

13. The method as claimed in claim 11 wherein said at least one article sensor comprises a zone article sensor for each of said zones.

14. The method as claimed in claim 13 wherein each said zone article sensor comprises a lateral beam extending across said conveying surface.

15. The method as claimed in claim 14 wherein said control is adapted to detect laterally adjacent articles from an output of at least one of said zone article sensors.

16. The method as claimed in claim 15 including detecting laterally adjacent articles by establishing an expected time of arrival of a leading edge of an article at said beam and determining if the actual time of arrival of the leading edge at said beam is different from the expected time of arrival.

17. The method as claimed in claim 16 wherein said detecting laterally adjacent articles includes detecting articles at an interface between the rollers of a zone and an upstream conveying surface upstream of that zone by operating the rollers of that zone at a speed that is different from the speed of the upstream conveying surface.

18. The method as claimed in claim 11 wherein said rollers defining said conveying surface are skewed, thereby providing the lateral bias biasing articles toward one of said side frame members.

19. The method as claimed in claim 11 including adjusting spaces between longitudinally adjacent articles after moving the one of the laterally adjacent articles into the longitudinal gap between the pair of laterally adjacent articles and an article longitudinally spaced from the pair of laterally adjacent articles.

20. The assembly as claimed in claim 1 wherein said rollers defining said conveying surface are skewed, thereby providing the lateral bias biasing articles toward one of said side frame members.

21. The assembly as claimed in claim 1 wherein said control is adapted to adjusting spaces between longitudinally adjacent articles after moving the one of the laterally adjacent articles into the longitudinal gap between the pair of laterally adjacent articles and an article longitudinally spaced from the pair of laterally adjacent articles.

* * * * *